May 1, 1923.
W. C. RASTETTER
STEERING WHEEL
Filed April 7, 1921
1,453,808
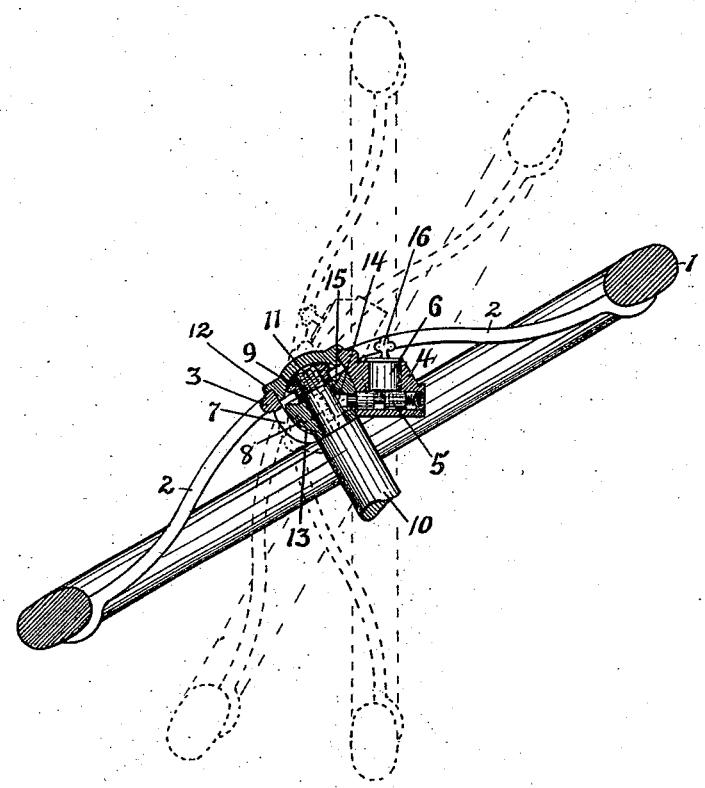
William C. Rastetter, Inventor
By Walter G. Burns, Attorney Patented May 1, 1923.

1,453,808

UNITED STATES PATENT OFFICE.

WILLIAM C. RASTETTER, OF FORT WAYNE, INDIANA.

STEERING WHEEL.

Application filed April 7, 1921. Serial No. 459,442.

*To all whom it may concern:*

Be it known that I, WILLIAM C. RASTETTER, a citizen of the United States of America, and resident of Fort Wayne, in the county of Allen and State of Indiana, have invented certain new and useful Improvements in Steering Wheels, of which the following is a specification.

This invention relates to improvements in steering wheels for automobiles, and the objects thereof are to provide a construction which will admit of the wheel being tilted upon its mount so as not to obstruct the driver in taking and leaving his seat; and to provide a lock for the wheel by which it may be disengaged from its mount so as to rotate idly thereon in either its normal or tilted positions and thereby prevent steering of the automobile.

These objects of the invention are accomplished by the construction illustrated in the accompanying drawing which is a vertical section of a steering wheel embodying the invention.

The characters of reference hereinafter appearing correspond with the similar characters on the drawing in the designation of the parts described.

The steering wheel is comprised of a wooden rim 1 mounted upon spider arms 2 that extend radially from the spider hub 3. Upon one side of the hub is a projecting lug 4 in which is arranged a spring pressed lock bolt 5 and a lock 6 for controlling the lock bolt. In the side of the hub opposite the lug is a slot 7, and within the hub is contained a ball comprised of two parts 8 and 9, the lower part 8 being keyed onto the steering stem 10 and the upper part 9 being screwed on to the tip 11 of the steering stem. A cap 12 closes the upper end of the hollow hub and bears against the upper part 9 of the ball. The lower part 8 of the ball has an annular groove 13 and also a recess 14 adapted to receive the end of the lock bolt when the wheel is adjusted to its normal position for steering the automobile. The ball has also a second annular groove 15 at the juncture of its parts 8 and 9 and which is adapted to receive the end of the lock bolt when the wheel is in tilted position.

In using the invention the wheel is held in normal position upon the steering stem 10 by engagement of the lock-bolt in the recess 14 in the lower part 8 of the ball which is keyed into the steering stem so that as the wheel is revolved the stem will likewise be turned. By turning the lock so that the lock bolt is withdrawn from the recess, the wheel may be tilted so that the lock bolt may enter the groove 15, thus locking the wheel in a tilted position in which it may be turned freely without actuating the steering stem, as the lock bolt will then pass around the annular groove. The wheel is returned to its normal position by turning the key so that the lock bolt is withdrawn from the groove 15 permitting the wheel to be titled back until the lock bolt enters the groove 13. The wheel is then turned until the lock bolt is brought into alinement with the recess 14, whereupon the lock bolt is pressed into the recess and the wheel is again locked into normal steering position.

What I claim is:—

1. In a device of the class described, a steering wheel having a hollow hub with an opening in one side thereof; a lock controlled bolt in connection with the hub at one side thereof; a steering stem extending up into the hub; and a ball rigidly fixed on the end of the steering stem within the hub, and having a recess adapted to receive the lock bolt when the wheel is in normal position, and having also an annular groove adapted to receive the lock bolt when the wheel is in tilted position.

2. In a device of the class described, a steering stem including a ball having an annular recess and a second recess in a different plane from the other recess; a steering wheel having a hollow hub enclosing the ball; and a locking means adapted to have engagement in the annular groove when the wheel is in tilted position, and to have locking engagement in said second recess when the wheel is in normal position.

In testimony whereof I affix my signature, in presence of two witnesses.

WILLIAM C. RASTETTER.

Witnesses:
E. J. O'CONNELL,
MATILDA METTLER.